United States Patent [19]

Murata et al.

[11] Patent Number: 5,032,160
[45] Date of Patent: Jul. 16, 1991

[54] METHOD OF PRESS MOLDING LENS MATERIAL

[75] Inventors: Jun Murata, Katano; Masaaki Sunohara, Nishinomiya; Takayuki Kimoto, Neyagawa, all of Japan

[73] Assignee: Matsushita Electric Industrial Co., Ltd., Osaka, Japan

[21] Appl. No.: 417,428

[22] Filed: Oct. 5, 1989

[30] Foreign Application Priority Data

Oct. 7, 1988 [JP] Japan .................. 63-254018
Mar. 24, 1989 [JP] Japan .................. 1-72411

[51] Int. Cl.$^5$ ............................................. C03B 21/00
[52] U.S. Cl. ........................................ 65/102; 65/64; 65/110; 65/275; 264/1.2; 264/2.7
[58] Field of Search ............... 65/102, 110, 275, 106, 65/64; 425/808; 264/1.1, 1.2, 2.7

[56] References Cited

U.S. PATENT DOCUMENTS 4,451,418  5/1984  Furuta et al. .................. 264/1.2
4,629,489 12/1986  Hirota et al. .................... 65/102
4,778,505 10/1988  Hirota et al. .................... 65/64

FOREIGN PATENT DOCUMENTS 3443607    6/1985  Fed. Rep. of Germany ...... 65/64
60-246231 12/1985  Japan .
61-53126   3/1986  Japan .
61-38130   8/1986  Japan ............................. 65/102
62-96329   5/1987  Japan .
63-325233  2/1988  Japan ............................. 65/102
63-182223  7/1988  Japan .

Primary Examiner—Richard V. Fisher
Assistant Examiner—John J. Bruckner
Attorney, Agent, or Firm—Wenderoth, Lind & Ponack

[57] ABSTRACT

A lens molding method where a lens material is set between an upper mold and a lower mold, and the molding pressure is reduced or made zero at least once during a heating & pressing step without the mold surfaces breaking contact with the lens materials, and during a cooling & pressing step.

9 Claims, 3 Drawing Sheets

METHOD OF PRESS MOLDING LENS MATERIAL

BACKGROUND OF THE INVENTION

1. Field of the Invention

The present invention relates to a press molding method for a lens, particularly to a molding method for a lens having excellent shape and surface accuracy.

2. Description of the Prior Art

A conventional press molding method for a glass lens will be explained with reference to FIGS. 4-7. In a case of making a glass lens by press molding, generally a lens material is cut into a specified size, preheated to a temperature near the glass transition point, placed between upper and lower molds which are formed so that the cavity, when closed, forms the same shape as that of a finished lens, and press-molded under a specified temperature and a specified pressure.

The shape of the lens material 1 is preferably as simple as possible in view of manufacturing steps or material cutting, and for example, as shown in FIG. 5, it may be a cylindrical body cut with a specified length from a bar material.

However, when such a material is molded, since a corner portion 6 of the material shown in FIG. 6 is deformed at the beginning and fits into an upper mold 2 and a lower mold 3, this results in generation of a closed space 7. Once the closed space is generated, the space continues to exist until the completion of the molding, and a faulty lens is obtained because the molded material surface is not accurately conformed to the mold shape. Using FIG. 7, a conventional method preventing such a faulty product is explained. The lower mold 3 is fixed to a base 3b through a connecting rod 3a, and the upper mold 2 is fixed to a piston rod 2b through a connecting rod 2a. The material is heated to a molding temperature by a heater 8. At the time of attaining a specified molding temperature, the upper mold 2 is lowered by a piston 9 and contacts the material. After that, up-and-down oscillation pressing is carried out by the upper mold by, for example, using a servo-pulser 10. For example, 90% of a pressing stroke is covered by the oscillation pressing and the remaining 10% of the stroke is covered by a regular pressing. When total pressing stroke is completed, power application is stopped, and when the temperature is lowered to a specified temperature, the cavity is opened. Then, a lens is taken out after being cooled. It is disclosed that when 90% of the total pressing stroke is oscillation-pressed during the above consecutive molding processes, a non-contact portion conventionally generated is eliminated (for example, Japanese Patent Publication No. 60-246231). In this conventional molding method, however, there are problems that since close contact and separation are repeated between the upper mold determining a lens shape and a lens material during a molding step, that is, during a heating and pressing step, at that time, air is swallowed which generates bubbles in the softened material. In addition, owing to the behavior of the above upper mold, position matching with the lower mold is very difficult and guarantee of the inclination of both sides of a molded lens is very difficult. Besides, owing to behavior of the upper mold described above, since the temperature of the upper mold becomes non-uniform, temperature distribution of the lens material becomes non-uniform and a large deformation is generated in the formed lens.

SUMMARY OF THE INVENTION

An object of the present invention is to provide a lens molding method which uses a cheap glass material and a press molding, to obtain a high precision lens.

For attaining the above object, the present invention is characterized in that in a method in which a lens material supplied into a space between a pair of upper and lower molds is press-molded by the upper and lower molds, the molding pressure is reduced or made zero at least once during the heating and pressing step, after completion of the heating and pressing step, or during the cooling and pressing step. In this method, the molding can be conducted without generating a non-contact portion between lens shape transfer surface on a mold and the lens material, axis discrepancy between the upper and lower molds can be prevented, and uneven lens shrinkage during the molding can be eliminated.

During the molding, by once reducing or stopping pressure application during the heating and pressing step or the cooling and pressing step to make the molding pressure closer or equal to normal pressure, defective molding due to swallowed air conventionally generated can be eliminated and a lens having excellent shape and surface accuracy can be obtained. In addition, since the molding is possible in the state that close contacts of the upper and lower molds with the lens material is always kept until completion of the cooling step, the shape of each of the upper and lower molds can be accurately transferred to the lens material as it is. Besides, the axis discrepancy can be avoided. Further, an inclination of both sides of the lens can easily be guaranteed by a molding stage and a pressing stage or the molds and a barrel mold. As the molds are kept in contact with the lens material, temperature distribution of heat transferring from the molds to the lens material becomes uniform. As deformation of the lens material during molding and uneven shrinkage of the material during cooling are eliminated, a lens having good shape accuracy can be obtained. On the other hand, even if the metal molds are separated from the lens material, desired lens shape can be obtained when the molding pressure is made zero or reduced, by making the molding pressure zero or reduced during a cooling and pressing step. If the coefficient of linear expansion of the lens material is $50 \times 10^{-7}$/deg at 100°-300° C., a slight discrepancy between the mold transfer surface shape and lens material shape can be eliminated during the cooling and pressing step.

DESCRIPTION OF THE PREFERRED EMBODIMENTS

First Embodiment

Figure 1:
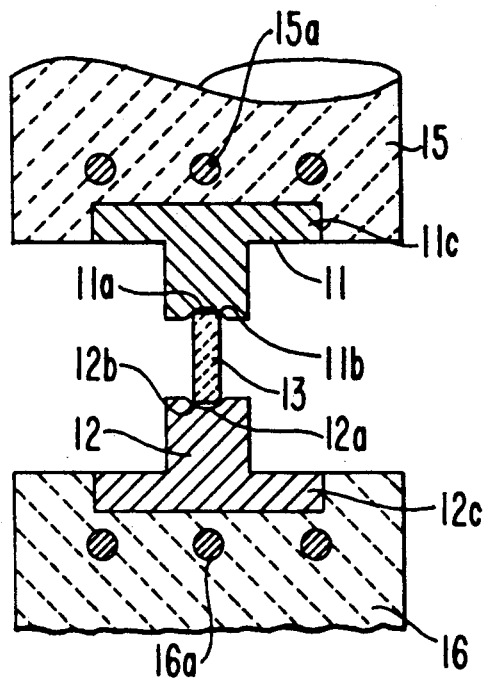
FIGS. 1 and 2 are sectional views of molding devices for carrying out a molding method of the present invention.

In FIG. 1, an upper mold 11 is engaged with a pressing stage 15 countersunk to receive an upper mold flange 11c and fixed by screws, etc. A lower mold 12 is engaged with a molding stage 16 countersunk to receive a lower mold flange 12c and fixed by screws, etc. In addition, the pressing stage 15 and the molding stage 16 are accurately adjusted to a position in which axis centers of the upper mold and the lower mold coincide with each other so that the axis centers do not shift from each other at the time of up-and-down shift of the upper mold 11. Heat sources 15a and 16a are provided in the pressing stage 15 and the molding stage 16. In addition, pressure is applied to the pressing stage 15 by, for example, a hydraulic pump, etc., so that precise pressure is transmitted to the upper mold. The upper mold can be stopped at an optional position. The pressure can be reduced to an arbitrary pressure or made zero during the molding.

Figure 3:
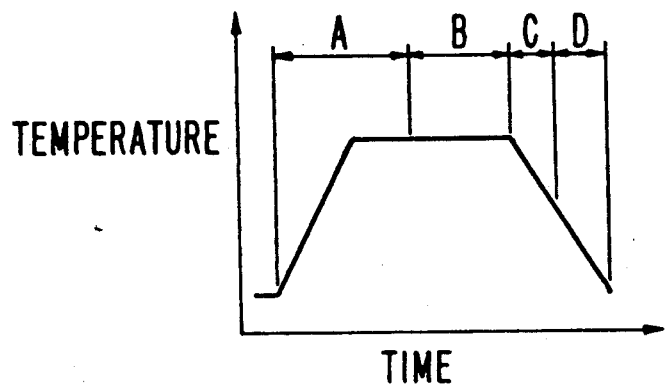
FIG. 3 shows a molding profile.
Figure 4:
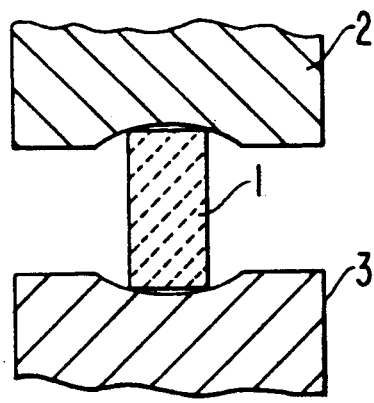
FIGS. 4-7 show sectional views of conventional molding devices and a lens material.

Referring to the molding device composed as described above, a glass material molding method is explained. A general molding profile is shown in FIG. 3. In FIG. 3, the abscissa and the ordinate denote time and temperature, respectively. Roughly, the molding process comprises a preheating step, a heating and pressing step, a cooling and pressing step and a cooling step. In the preheating step, temperatures of the molds and the lens material are raised to temperatures which enable the molding. This is called a preheating step A. When temperature distribution in the molds becomes uniform, the lens material is deformed to an optional thickness by applying pressure on the molds. This is called a heating and pressing step or a soaking and pressing step B. After the lens material is deformed to the optional thickness, the material is cooled under conditions that the pressing force is kept as it is. This is called a cooling and pressing step C. After the cooling and pressing step is continued up to temperatures enabling deformation of the pressed lens material, the pressing force is released to make the pressure zero. Then cooling is further continued. This is called a cooling step D. After the temperatures become normal, the molds are opened and the lens is taken out. An ordinary molding process is conducted as described above.

Adopting the above fundamental process, the molding method of the invention solves many problems. That is, the lens material is a cylindrical body shown in FIG. 5 and its end surface is a mirror-surface. In this embodiment, an optical glass SF-8 (glass transition point; 420° C., coefficient of linear expansion; $90 \times 10^{-7}$/deg at 100°–300° C.) cylindrical body with a diameter of 5 mm and a length of 7 mm is used. After this lens material is vertically placed so that the end surface faces the mold transfer surface, the transfer surface 12a of the lower mold 12, the pressing stage 15 lowers and the transfer surface 11a of the upper mold 11 line-contacts the glass material 13 at the periphery of the glass material. At this instant, the dead load of the pressing stage is applied on the lens material. Under these conditions, heating sources built in the pressing stage 15 and the molding stage 16 are energized and heating is conducted until the temperature of the lens material reaches 530° C. Said preheating step is carried out up to this point. When the temperature of the lens material reaches 530° C., the viscosity of the glass material becomes $10^{10}$ poise.

Then, pressure is applied to the pressing stage by a hydraulic pump, and the upper mold 11 starts to press the lens material. That is, from this instant, the heating and pressing step begins. 2 kg/mm² or more is favored for the pressure at this time. During the heating and pressing step, the molding pressure is once made zero after the passage of a specified period of time, and by raising the pressing stage 15, the transfer surface 11a of the upper mold 11 is separated from the lens material. When said pressure becomes zero, positive pressure inside each of spaces 11b and 12b formed by the mold transfer surfaces 11a and 12a and the end surfaces of the lens material returns to normal pressure. Then the pressing stage 15 is again lowered, and close contacts of the transfer surface 11b of the mold 11 and the transfer surface 12b of the mold 12 with the lens material are made. At this time, the volumes of spaces 11b and 12b encircled by the transfer surfaces 11a and 12a and the end surfaces of the lens material become smaller than those of the spaces 11b and 12b immediately after the start of the heating and pressing step. Pressure is again applied to the pressing stage by the hydraulic pump, and the upper mold starts to press the lens material. When the upper mold is lowered to a specified position, the pressing stage 15 stops. Said heating and pressing step is carried out up to here. At this time, the viscosity of the lens material becomes $10^9$ poise. At the completion of the heating and pressing step on the lens material, there is a portion in which the mold transfer surface is not completely contacting the lens material and a closed space is generated and thus the internal pressure becomes high due to the molding pressure.

At the completion of the heating and pressing step, the molding pressure is made zero, and the pressing stage 15 is raised so that the transfer surface 11a of the upper mold 11 is separated from the lens material. When said pressure is made zero, positive pressure inside each of the spaces 11b and 12b encircled by the mold transfer surfaces 11a and 12a returns to normal pressure. Then the pressing stage 15 is again lowered so that the transfer surface 11b of the upper mold 11 and the transfer surface 12b of the lower mold 12 contact the lens material. At this instant, the volumes of the spaces 11b and 12b encircled by the transfer surfaces 11a and 12a and the end surfaces of the lens material become still smaller than those of the spaces 11b and 12b at the completion of the heating and pressing step, or become almost zero.

Then the cooling and pressing step follows. That is, energization of the heating sources built in the pressing stage 15 and the molding stage 16 is stopped, and supply of pressure of 2 kg/mm² or more from the pressure pump to the pressing stage is continued, as in the case of the heating and pressing step. During the cooling and pressing step, after a specified time passes, the molding pressure is once made zero, and by raising the pressing stage, the transfer surface 11a of the upper mold 11 is separated from the lens material. Positive pressure existing inside the spaces 11b and 12b encircled by the mold transfer surfaces 11a and 12a and the end surfaces of the lens material just before the pressure is made zero, returns to normal pressure. Then, the pressing stage 15 is again lowered so that close contact between the transfer surfaces 11b and 12b of the molds 11 and 12 and the lens material is made. At this time, the transfer surfaces 11a and 12a are completely contacted with the lens material, and the spaces 11b and 12b encircled by the end surfaces of the lens material just before the start of the cooling and pressing step, become almost zero. In addition, even if the transfer surface 11a of the upper mold 11 is separated from the lens material so that the pressure is released during the cooling and pressing step in which a stage of viscosity slightly higher than that during the heating step exists, the lens surface does not suffer from the effect of swallowed bubbles.

Then, after performing the cooling and pressing down to 430° C., the pressure supply is stopped to again make the molding pressure zero. At this instant, close contact is kept between the lens material and the molds.

The cooling step follows. That is, a state in which the lens material contacts closely with the molds is left as it is until the temperature of the lens inside the molds becomes normal, and then the pressing stage is raised to open the molds and take out the lens. The lens material end surface concavity rarely remaining during the cooling and pressing step, becomes smaller and the mold surface is almost completely contacted with the lens material due to the flow following shrinkage of the glass material.

Besides, if the coefficient of linear expansion of the lens material is $50 \times 10^{-7}$/deg or more, the flow due to the shrinkage of the glass material becomes larger, and the concavity on the lens surface easily becomes zero. During the molding, a pressure imposed on the molds necessary to generate minimum compression air pressure necessary for releasing the pressure inside the space encircled by the mold transfer surface and the lens material end surface can be made small.

In this embodiment, the molding was performed by a pressure of 2 kg/mm$^2$ or more. The molding pressure was once made zero during the heating and pressing step, at the completion of the heating and pressing step and during the cooling and pressing step. However, since only by carrying out the pressure reduction during the heating and pressing step, at the completion of the heating and pressing step and during the cooling and pressing step, the pressure inside the spaces 11b and 12b returns to normal pressure, selection only of the pressure reduction is possible. In addition, if while the close contact between the upper mold 11 and the lens material is kept as it is, the molding pressure is made zero or reduced, this is desirable in view of heat distribution of the lens material and prevention of swallowed air. As shown in this embodiment, if the upper mold 11 is separated from the lens material when the molding pressure is made zero, air is sometimes swallowed to generate a small concavity on the lens material surface, especially on the surface contacting the mold transfer surface. However, by making the molding pressure zero during the cooling and pressing step, the concavity is completely eliminated or becomes sufficiently small not to affect the lens performance.

In this embodiment, the pressure is once made zero after a specified time, during the heating and pressing step, at the completion of the heating and pressing step and during the cooling and pressing step, but it is more effective to perform zero pressure operation twice or more during each such step depending on the shape and dimension of the lens.

In addition, pressure release timing can be determined according to the quantity of shrinkage in the cooling and pressing step. Further, the lens material and the molds are kept in close contact, but the cooling step can follow under the conditions in which the upper mold 11 and lens are separated.

Second Embodiment

Figure 2:
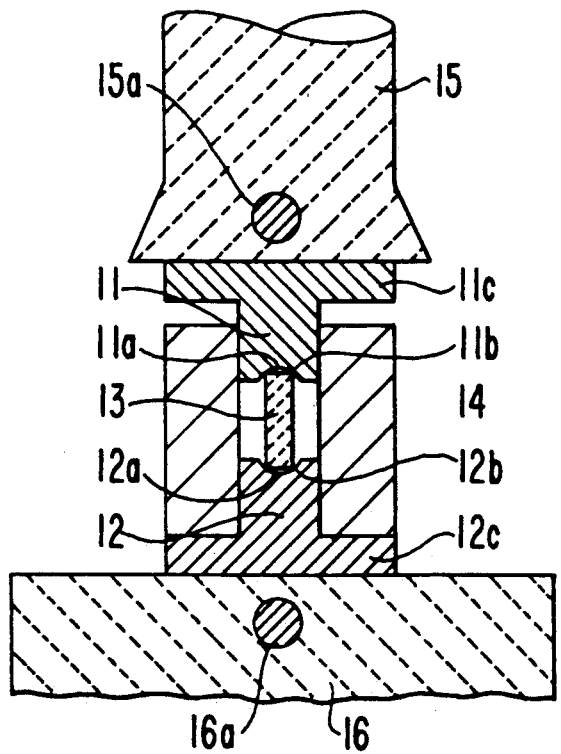
Figure 5:
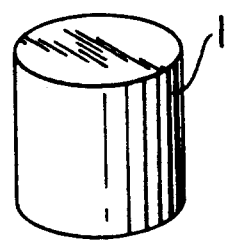
Figure 6:
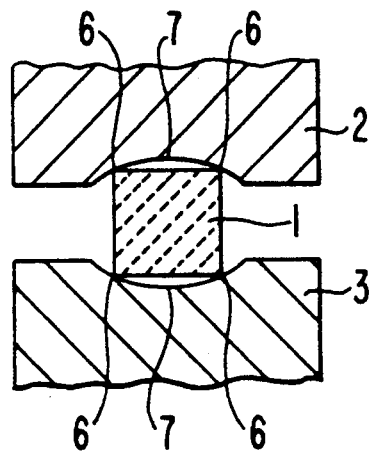
Figure 7:
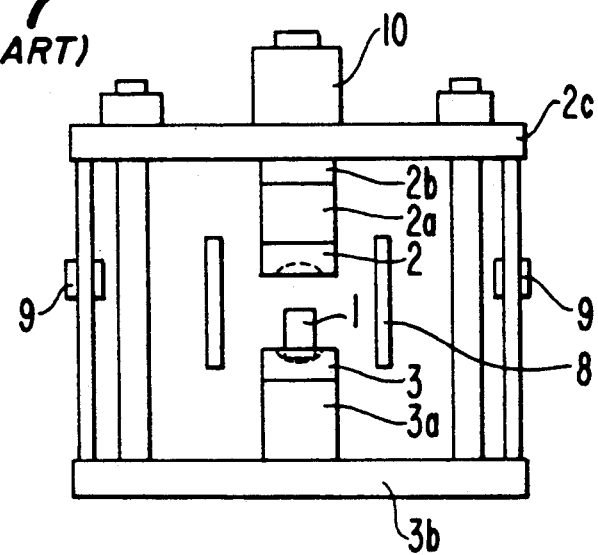

As shown in FIG. 2, the molding device for the present invention molding method has a barrel mold 14 which is adjusted to an optional height so that any discrepancy between the axes of the upper mold 11 and the lower mold 12 is eliminated and the specified lens thickness can be obtained, and has the lens material 13 supplied into the space encircled by the upper mold, lower mold and barrel mold. The lens material is, as shown in FIG. 5, cylindrical with mirror end surfaces. This material is supplied into the molds so that both end surfaces contact the transfer surfaces of the upper and lower molds. The pressing stage 15 has a heating source 15a therein, and, for example, the pressing force is applied by a hydraulic pump, etc. to the pressing stage. Besides, the pressing stage is composed so that the pressure is optionally reduced or made zero during the molding. The molding stage 16 has a heating source 16b therein. The molding stage 16 is fixed.

Referring to the molding device composed as described above, the glass material molding method is explained. The material is cylindrical with a diameter of 8 mm and a length of 10 mm, made of optical glass SF-8 (glass transition point; 420° C., coefficient of linear expansion $90 \times 10^7$/deg at 100°-300° C.). This material is vertically supplied to the transfer surface 12a of the lower mold 12, and then the upper mold 11 is inserted into the barrel mold 14 to contact the lens material. After that, the heating source is energized to heat the lens material to 530° C. (a preheating step). When the temperature of the lens material reaches 530° C., the viscosity of the lens material becomes $10^{10}$ poise.

Then pressure is supplied to the pressing stage and the upper mold 11 starts to press the material (a heating and pressing step). 2 kg/mm$^2$ or more is preferable for the pressure at this instant. It moves through a stroke called the total heating and pressing stroke having a length such that a gap which is present between the upper mold 11 and the barrel mold 14 when the lens material is supplied into the space encircled by the upper and lower molds and the barrel mold positioning the upper and lower molds, is eliminated. During the heating and pressing step, after a specified time, the molding pressure is once made zero and the pressing stage 15 is raised to be separated from the upper mold flange 11c. Just before the pressure is made zero, positive pressure inside each of the spaces 11b and 12b encircled by the mold transfer surfaces 11a and 12a and the lens material end surfaces returns to normal pressure. Then the pressing stage 15 is again lowered to be in close contact with the flange of the upper mold 11. Also, when the molding pressure is made zero, the transfer surface 11b of the upper mold 11 and the transfer surface 12b of the lower mold 12 are left in close contact with the lens material. In this instant, the volumes of the spaces 11b and 12b become much smaller than those of the spaces 11b and 12b immediately after the start of the heating and pressing step. The pressure is again supplied to the pressing stage by the hydraulic pump, and the upper mold 11 starts to press the lens material. The heating and pressing step is completed when the press has been moved through the total heating and pressing stroke. At this instant, the viscosity becomes $10^9$ poise. At the time when the press has been moved through the total heating and pressing stroke, that is, when the heating and pressing step has been completed, there is a portion in which the mold transfer surface is not completely contacted with the lens material. After a specified time, the molding pressure is once made zero, and the pressing stage 15 is raised and separated from the upper mold flange 11c. Just before the pressure is made zero, the positive pressure inside the spaces 11b and 12b returns to the normal pressure. Then the pressing stage 15 is again lowered, and the flange of the mold 11 and the pressing stage 15 are closely contacted. Also, when the molding pressure is made zero, the transfer surface 11b of the upper mold 11 and the transfer surface of the lower mold 12 are left in close contact with the lens material. At this instant, the volumes of the spaces 11b and 12b become smaller than those of the spaces 11b and 12b after the completion of the heating and pressing step.

Next, a cooling and pressing step follows. During this step, after a specified time the molding pressure is once made zero, and the pressing stage 15 is raised to be separated from the upper mold flange 11c. Just before the pressure is made zero, the positive pressure inside the spaces 11b and 12b returns to normal. Then the pressing stage 15 is again lowered to be in contact with the metal mold flange 11c. At this instant, the upper mold flange 11c and the end surface of the barrel mold are left closely contacted. At this time, the volumes of the spaces 11b and 12b become much smaller than those of the spaces 11b and 12b just before the start of the cooling and pressing step or become almost zero. Then the cooling and pressing is performed down to 430° C. Even if, in a rare case, a small concavity remains on the lens material surface at the completion of the cooling and pressing step due to the flow from the lens material shrinkage in the cooling step, the spaces 11b and 12b are completely eliminated.

In addition, if the coefficient of linear expansion of the lens material is $50 \times 10^{-7}$/deg or more, since the quantity of flow of the lens material becomes larger, the concavity on the lens surface is easily eliminated. After that, the pressure supply is stopped and the molding pressure is made zero. Then, when the temperature of the lens inside the molds becomes room temperature, the molds are opened and the lens is taken out. In this embodiment, since the pressing stage and the upper mold flange are not fixed and the molding is carried out under conditions in which the molds and the material are in contact with each other, the transfer characteristics are extremely improved. During the molding, a pressure imposed on the molds necessary for generating, inside the space encircled by the mold transfer surface and the lens material end surface, minimum compressed air pressure necessary for releasing the pressure inside the space encircled by the mold transfer surface and the lens material end surface, can be made small.

In this embodiment, a molding pressure of 2 kg/mm² or more was used. The molding pressure was made zero during the heating and pressing step, at the completion of the heating and pressing step and during the cooling and pressing step. However, since only by reducing the pressure depending on the scale of the lens material, the pressure inside the spaces 11b and 12b returns to normal, only selection of pressure reduction is available. In addition, as shown in FIG. 2, it is unnecessary for the barrel mold adjusting the lens thickness to contact the upper and lower molds. The following method can be selected: by incorporating a ring-like barrel mold or a block-like spacer outside the upper and lower mold flanges 11c and 12c which are in close contact with the pressing stage 15 and the molding stage 16, the gap between the pressing stage 15 and the molding stage 16 is adjusted. Besides, even if a mold transfer method is adopted, in which the cooling and pressing step, the cooling step, etc. are respectively transferred into a separate stage, a lens with completely the same performance as obtained without mold transfer can be obtained.

Third Embodiment

Construction of the molding device is the same as that of the second embodiment. Referring to the molding device, the glass material molding method is explained. The material is a cylindrical optical glass SF-8 (glass transition point; 420° C., coefficient of linear expansion; $90 \times 10^7$/deg at 100°-300° C.) body with a diameter of 8 mm and a length of 10 mm. This material is vertically supplied to the transfer surface of the lower mold 12, and then the upper mold 11 is inserted into the barrel mold 14 to bring it in contact with the lens material. After that, the heating source is energized to raise the temperature to 530° C. (a preheating step). When the temperature of the lens material reaches 530° C., the viscosity of the lens material becomes poise. Then, pressure is applied to the pressing stage and the upper mold starts to press the material (a heating and pressing step). The pressure at this time is preferably 2 kg/mm² or more. It moves through a stroke called the total heating and pressing stroke having a length such that a gap which is present between the upper mold 11 and the barrel mold 14 when the lens material is supplied into the space encircled by the upper and lower molds and the barrel mold positioning the upper and lower molds, is eliminated. The total heating and pressing stroke in this embodiment is 5 mm. When the stroke reaches 2.5 mm, the molding pressure is once made zero, and the pressing stage 15 is raised to be separated from the upper mold flange 11c. Just before the pressure is made zero, the positive pressure inside the spaces 11b and 12b encircled by the mold transfer surfaces 11a and 12a and the lens material end surface returns to normal. Then the pressing stage 15 is again lowered and the flange of the mold 11 and the pressing stage are made closely contacted. Even if the molding pressure is made zero, the transfer surfaces 11b and 12b of the upper and lower molds 11 and 12 are left in close contact with the lens material. At this time, the volumes of spaces 11b and 12b become much smaller than those of the spaces 11b and 12b immediately after the start of the heating and pressing step. Pressure is again applied to the pressing stage by the hydraulic pump, and the upper mold 11 starts to press the lens material. When the total heating and pressing stroke is completed, the heating and pressing step is completed. The viscosity of the lens material at this time becomes $10^9$ poise When the total heating and pressing stroke is completed, that is, at the completion of the heating and pressing step, there is a portion on the lens material with which the mold transfer surface has not completely contacted.

The cooling and pressing step follows. At the completion of this step, the volumes of the spaces encircled by the transfer surfaces 11a and 12a and the lens material end surfaces become much smaller than those of the spaces 11b and 12b just before the start of the cooling and pressing step, or become almost zero.

Thereafter, the cooling step is carried out to bring the temperature down to room temperature. Even if a small concavity remains on the lens material surface at the completion of the heating and pressing step, due to the flow from the lens material shrinkage during the cooling and pressing step, the spaces 11b and 12b are completely eliminated. In addition, if the coefficient of linear expansion of the lens material is $50 \times 10^{-7}$/deg or more, since the flow quantity of the lens material becomes larger, the concavity on the lens surface is easily eliminated. Then the pressure application is stopped and the molding pressure is made zero. When the temperature of the lens inside the molds becomes room temperature, the molds are opened and the lens taken out.

In this embodiment, since the pressing stage and the upper mold flange are not fixed, and the molding is carried out under the conditions in which the molds always contact the material, the transfer characteristics are extremely improved. In the embodiment, the molding pressure is once made zero during the heating and pressing step. However, since by merely reducing pressure depending on the scale of the lens material, the pressure inside the spaces 11b and 12b returns to normal, only pressure reduction need be used. Besides, as shown in FIG. 2, it is unnecessary for the barrel mold adjusting the lens thickness to be in contact with the upper and lower molds. The following method can be selected: by incorporating a ring-like barrel mold or a block-like spacer outside the upper and lower mold flanges 11c and 12c which are in close contact with the pressing stage 15 and the molding stage 16, the gap between these stages can be adjusted. Besides, even if a mold transfer method is adopted in which the cooling and pressing step, the cooling step, etc. are respectively transferred onto a separate stage, a lens with completely the same characteristics can be obtained. During the molding, a pressure imposed on the molds necessary for generating, inside the space encircled by the mold transfer surface and the lens material end surface, minimum compressed air pressure necessary for releasing the pressure inside the space encircled by the mold transfer surface and the lens material end surface, can be made small. In this embodiment, the molding pressure of 1 kg/mm² or more was used.

Fourth Embodiment

The constitution of the molding device is the same as that of the first embodiment. A molding method for glass material using the molding device is explained. The general molding profile is the same as the one described in the first embodiment. The lens material is cylindrical as shown in FIG. 5 and its end surface is mirror-like. In the present embodiment, a cylindrical optical glass SF-8 (glass transition point; 420° C., coefficient of linear expansion; $90 \times 10^{-7}$/deg at 100° C.-300° C.) 5 mm in diameter and 7 mm in length is employed.

The preheating step is the same as that of the first embodiment. Then, pressure is applied to the pressing stage by a hydraulic pump, and the upper mold 11 starts to press the lens material. Pressure at this time is preferably 2 kg/mm² or more. When the upper mold 11 descends to a specified level, the pressing stage 15 stops. This is a heating and pressing step. Here, the molding pressure is once made zero, and the transfer surface 11a of the upper mold and the lens material are separated by raising the pressing stage 15. Viscosity of the lens material at this time becomes $10^9$ poise. When the upper mold 11 descends to the specified level, there is a part of the transfer surface on the lens material which the mold transfer surface does not contact, since pressure inside the spaces 11b and 12b encircled by the mold transfer surfaces 11a and 12a and the lens material is positive. When the molding pressure is made zero, positive pressure inside the spaces 11b and 12b returns to normal.

Next, the pressing stage 15 is again lowered, and the cooling and pressing step starts by closely contacting the transfer surfaces 11b and 12b of the upper and lower molds 11 and 12 with the lens material. Namely, by turning off the energization of the heating sources in the pressing stage 15 and the molding stage 16, only pressure of 2 kg/mm² or more is applied to the pressing stage by the pressure pump. After cooling and pressing down to 430° C., the pressure application is stopped, and the molding pressure is made zero. At this time, the lens material and the molds are left in close contact with each other.

Then the cooling step follows. Namely, until the lens temperature within the mold reaches room temperature, the lens material and the mold are left in close contact. Then the pressing stage is raised, the mold is opened and the lens is taken out. Although the spaces 11b and 12b become smaller and remain as concavities on the surface of the lens material, the size has no effect on the lens performance. Furthermore, if a coefficient of linear expansion of the lens material is equal to or more than $50 \times 10^{-7}$/deg, the concavity on the lens surface is almost eliminated since the flow of the glass material becomes larger.

In this embodiment, although the molding pressure is made zero at the point of finishing the heating and pressing step, depending on the lens material size, only a pressure reduction need be selected, as the spaces 11b and 12b return to normal pressure. In addition, after finishing the heating and pressing step, the pressing force can be made zero under the condition that the lens material is not separated from the molds which are left in close contact therewith. Furthermore, although after finishing the cooling and pressing step in this embodiment the lens material and the molds are left in close contact, the cooling step can be carried out under condition that the upper mold 11 and lens are separated by raising the pressing stage.

Fifth Embodiment

The constitution of the molding device is the same as that of the second embodiment. A molding method of glass material by the molding device is explained.

The material is a cylindrical optical glass SF-8 (glass transition point; 420° C., coefficient of linear expansion; $90 \times 10^{-7}$ deg at 100° C.-300° C.) 8 mm in diameter and 10 mm in length. This material is vertically supplied to the transfer surface 12a of the lower mold 12, and the upper mold is inserted to match the barrel mold, and contacted with the lens material. The molding method is similar to that of the fourth embodiment. However, in this embodiment, also when the molding pressure is made zero after completion of the heating and pressing step, the mold transfer surface and the lens material are left in contact. This point is different from the fourth embodiment.

Sixth Embodiment

The molding device is the same as that in the first embodiment. The lens material is cylindrical as shown in FIG. 5 and its end face is mirror-like. In the present embodiment, a cylindrical optical glass SF-8 (glass transition point; 420° C., coefficient of linear expansion; $90 \times 10^{-7}$ at 100° C.-300° C.) 5.5 mm in diameter and 7 mm in length is employed. The preheating step is the same as in the first embodiment. When the lens material temperature is 530° C. after finishing the preheating step, viscosity of the lens material becomes poise.

Pressure is then applied to the pressing stage by a hydraulic pump, and the upper mold 11 begins to press the lens material. Pressure at this time is preferably 2 kg/mm² or more. When the upper mold 11 descends to a predetermined level, the pressing stage 15 stops. This is a heating and pressing step. The viscosity of the lens material at this time becomes $10^9$ poise. When the upper mold 11 descends to the specified level, there is a part of the transfer surface on the lens material which the mold transfer surface does not contact, since the spaces 11b and 12b encircled by the mold transfer surfaces 11a and 12a and the lens material have a positive pressure.

The cooling and pressing step follows. Namely, the energization of the heating sources built in the pressing stage 15 and the molding stage 16 is stopped, and pressure application of 2 kg/mm² or more is continued by using a pressure pump, similar to the heating and pressing step. During the cooling and pressing step, after a specified time the molding pressure is once made zero, and the transfer surface 11a of the upper mold 11 and the lens material are separated from each other by raising the pressing stage 15. When said pressure is made zero, positive pressure inside the spaces 11b and 12b returns to normal pressure. Next, by again lowering the pressing stage 15, the transfer surfaces 11b and 12b of the molds 11 and 12 are brought in contact with the lens material. At this time, the spaces 11b and 12b have considerably less volume than they do during the heating and pressing step. In addition, the lens surface is not affected by swallowed bubbles generated when the transfer surface 11a of the upper mold is separated from the lens material in order to release the pressure during the cooling and pressing step in which the viscosity is somewhat higher than that during heating.

Next, after performing the cooling and pressing down to 430° C., the pressure application is stopped and the molding pressure is again made zero. At this time, the lens material and the mold are kept in close contact. The cooling step then follows. Namely, until the lens temperature within the mold reaches room temperature, the lens material and the molds are left in close contact. The pressing stage is then raised and by opening the mold, the lens is taken out. Although the spaces 11b and 12b encircled by the mold transfer surfaces 11a and 12a and the lens material end faces, due to flow by shrinkage of glass material during cooling, become smaller and remain as the concavities on the lens material surface, their size has no effect on the lens performance. Furthermore, if the coefficient of linear expansion of the lens material is equal to or more than $50 \times 10^{-7}$/deg, the concavity on the lens surface is almost eliminated due to the flow quantity of the glass material.

In the above embodiment, although the molding pressure is made zero during the cooling and pressing step, depending on the lens material size or shape, only reducing the pressure can be selected. In addition, the transfer characteristics can be further improved by making the pressing force a reduced force or zero under the conditions that during cooling the upper mold and the lens material are not separated and are left in close contact. Although the pressure is made zero once during the cooling and pressing step, after the specified time during the cooling and pressing step, the effect becomes even stronger if pressure reduction is performed twice or more depending on the lens shape or dimension. In addition, according to the shrinkage during the cooling and pressing step, a time for releasing the pressure can be set. In addition, although in the present embodiment the lens material and the mold were kept in close contact with each other after finishing the cooling and pressing step, the cooling step can be carried out with the upper mold 11 and the lens separated from each other by raising the pressing stage.

Seventh Embodiment

The molding device is the same as that in the second embodiment. The lens material is a cylindrical optical glass SF-8 (glass transition point; 420° C., coefficient of linear expansion; $90 \times 10^{-7}$/deg at 100° C.-300° C.) 8 mm in diameter and 10 mm in length. The molding method is the same as that of the sixth embodiment except that the mold transfer surfaces and the lens material are always kept in contact with each other during the cooling and pressing step even when the molding pressure is made zero or reduced. Therefore, a very precise lens can be made since during the molding the molds and the material are always in contact with each other.

Eighth Embodiment

The constitution of the molding device is the same as that of the first embodiment. The lens material is cylindrical as shown in FIG. 5 and its end face is mirror-like. In the present embodiment, a cylindrical optical glass SF-6 (glass transition point; 421° C., coefficient of linear expansion; $97 \times 10^{-7}$/deg at 100° C.-300° C.) 5.5 mm in diameter and 5.5 mm in length is employed. The preheating step is the same as in the first embodiment. Viscosity of the glass material becomes poise when the temperature of the lens material reaches 530° C.

Then, pressure is applied to the pressing stage by using a hydraulic pump, and the upper mold 11 starts to press the lens material. That is, the heating and pressing step starts at this time. Pressure at this time is preferably 2 kg/mm² or more. During the heating and pressing step, the molding pressure is once made zero after a specified time period, and the transfer surface 11a of the upper mold 11 and the lens material are separated from each other by raising the pressing stage. When said pressure is made zero, the pressure inside the spaces 11b and 12b encircled by the mold transfer surfaces 11a and 12a and the lens material returns to normal pressure. Next, by again lowering the pressing stage 15, the transfer surfaces 11b and 12b of the upper mold 11 and lower mold 12, respectively, are brought into close contact with the lens material. At this time, the volume of the spaces 11b and 12b becomes considerably smaller than it does just after the start of the heating and pressing step. With a pressurization of the pressing stage by using the hydraulic pump, the mold 11 starts to press the lens material. When the upper mold 11 descends to a specified level, the pressing stage stops. This is the end of the heating and pressing step. Viscosity of the lens material at this time becomes $10^9$ poise. At the time of finishing the heating and pressing step, the lens material has a closed space with only a part of the transfer surface of the metal mold transfer surface in contact therewith and the space has high internal pressure caused by the molding pressure.

At the time of finishing the heating and pressing step, the molding pressure is made zero, and the transfer surface 11a of the upper mold 11 and the lens material are separated from each other by raising the pressing stage 15. Just before said pressure is made zero, positive pressure inside the spaces 11b and 12b returns to normal pressure. Next, by again lowering the pressing stage 15, the transfer surfaces 11b and 12b of the upper mold 11 and lower mold 12 are brought in close contact with the lens material. The spaces 11b and 12b at this time have a smaller volume or almost zero volume compared with the spaces 11b and 12b at the completion of the heating and pressing step.

Next, the cooling and pressing step follows. That is, the energization of the heating sources in the pressing stage and the molding stage is ended, and pressure of 2 kg/mm$^2$ or more is applied to the pressing stage by using a pressure pump as in the case of the heating and pressing step. After performing cooling and pressing down to 430° C., the pressure application is stopped and the molding pressure is again made zero. At this time the lens material and the molds are kept in contact.

The cooling step follows. Namely, until the lens temperature within the mold reaches room temperature, the lens material and the molds are kept in close contact. Then, by raising the pressing stage the mold is opened to take out the lens. The spaces 11b and 12b become almost zero upon release of the molding pressure during and after the heating and pressing step. In a rare case, the concavities on the end face of the lens material which have not disappeared just before the start of the cooling and pressing step become smaller and the lens can be almost perfectly formed due to the shrinkage of the glass material during the cooling and pressing step. In addition, if the coefficient of linear expansion of the lens material is equal to or more than $50 \times 10^{-7}$/deg, the concavities on the lens surface are apt to disappear since the flow quantity due to the shrinkage of the glass material is sufficient to cause this.

In the above embodiment, although the molding pressure is made zero once during the heating and pressing step and at the completion of this step, depending on the size or shape of the lens material, pressure reduction only can be carried out during the heating and pressing step and at the completion of this step; because the pressure inside the spaces 11b and 12b will return to normal pressure. Furthermore, it is desirable in view of heat distribution of the lens material and prevention of swallowed air that the molding pressure be made zero or reduced while the upper mold 11 and the lens material are in close contact. In the present embodiment, if the upper mold 11 and the lens material are separated from each other when the pressure is made zero, air is swallowed and a small concavity may be generated on the lens material surface, especially on a good surface contacted by the mold transfer surface. But by reducing the molding pressure to zero, the concavity completely disappears or becomes smaller so as to have no effect on the lens performance. In the present embodiment, although the molding pressure is made zero once after a specified time period during the heating and pressing step and at the end of this step, the effect is increased if it is made zero twice or more depending on the shape and dimension of the lens.

Ninth Embodiment

The molding device is the same as in the second embodiment. The material is a cylindrical optical glass SF-8 (glass transition point; 420° C., coefficient of linear expansion; $90 \times 10^{-7}$/deg at 100° C.-300° C.) 4 mm in diameter and 6 mm in length. The molding method is the same as in the eighth embodiment, except that in this embodiment the mold transfer surfaces and the lens material are always in contact with each other during the molding, and a very precise lens can be made.

Tenth Embodiment

The constitution of the molding device is the same as in the first embodiment. The lens material is cylindrical as shown in FIG. 5 and its end face is mirror-like. In the present embodiment, a cylindrical optical glass SF-8 (glass transition point; 420° C., coefficient of linear expansion; $90 \times 10^{-7}$/deg at 100° C.-300° C.) 5 mm in diameter and 7 mm in length is employed. The preheating step is the same as in the first embodiment. Viscosity of the glass material becomes poise when the temperature of the lens material reaches 530° C.

Then, with a pressurization of the pressing stage by using a hydraulic pump, the upper mold 11 starts to press the lens material. That is, the heating and pressing step starts at this time. Pressure at this time is preferably 2 kg/mm$^2$ or more. During the heating and pressing step, the molding pressure is made zero once after a specified time, and the transfer surface 11a of the upper mold 11 and the lens material are separated from each other by raising the pressing stage. When the pressure is made zero, the positive pressure inside the spaces 11b and 12b encircled by the mold transfer surfaces 11a and 12a and the lens material returns to normal pressure. Next, by again lowering the pressing stage 15, the transfer surfaces 11b and 12b of the upper mold 11 and the lower mold 12 are brought into contact with the lens material. At this instant, the spaces 11b and 12b have a considerably smaller volume than they do just after the start of the heating and pressing step. Pressure is again applied to the pressing stage by using a hydraulic pump, and the upper mold 11 starts to press the lens material. When the upper mold 11 descends to a specified level, the pressing stage 15 stops, thus ending the heating and pressing step. Viscosity of the lens material at this time becomes 10$^9$ poise. At the end of the heating and pressing step, the lens material has a part of the surface which the mold transfer surface does not contact.

Next, the cooling and pressing step follows. That is, the energization for the heating sources in the pressing and molding stages is discontinued and application of pressure of 2 kg/mm$^2$ or more is continued from a pressure pump as in the case of the heating and pressing step. During the cooling and pressing step, the molding pressure is made zero once after a specified time, and the transfer surface 11a of the upper mold 11 and the lens material are separated from each other by raising the pressing stage. The spaces 11b and 12b, which had positive pressure just before said pressure is made zero, return to normal pressure. Next, by again lowering the pressing stage 15, the transfer surfaces 11b and 12b of the upper mold 11 and the lower mold 12 are brought into close contact with the lens material. At this time, volumes of the spaces 11b and 12b become considerably smaller than those of the spaces 11b and 12b at the end of the heating and pressing step. In addition, the lens surface does not suffer from swallowed bubbles generated when the transfer surface of the upper mold 11 is separated from the lens material in order to release the pressure during the cooling and pressing step in which the viscosity is somewhat higher than that during heating.

Next, after performing cooling and pressing down to 430° C., the pressure application is stopped, and the molding pressure is again made zero. The lens material and the mold are kept in close contact at this time. Then the cooling step follows. Namely, until the lens temperature within the mold reaches room temperature, the lens material and the molds are kept in close contact. By raising the pressing stage, the mold is opened to remove the lens. The spaces 11b and 12b become smaller, due to the flow from the shrinkage of the glass material during the cooling and pressing step. Although a concavity may remain on the lens material surface, its size has no effect on the lens performance. In addition, if the coefficient of linear expansion of the lens material is equal to or more than $50 \times 10^{-7}$/deg, the concavity on the lens surface becomes almost zero since the flow quantity following shrinkage of the glass material becomes larger.

In the above embodiment, though the molding pressure is made zero once during the heating and pressing step and the cooling and pressing step, depending on the size or shape of the lens material, simply reducing the pressure can be carried out, as the spaces 11b and 12b return to normal pressure simply by reducing the pressure during both steps. In addition, it is desirable in view of heat distribution of the lens material and prevention of swallowed air that the molding pressure be made zero or reduced under conditions that the upper mold 11 and the lens material are left in close contact. In this embodiment, if the upper mold 11 is separated from the lens material when the molding pressure is made zero, swallowed air occurs and small concavities are sometimes produced on the lens material, especially on the good surface formed by the metal mold transfer surface. But, by making the molding pressure zero during the cooling and pressing step, the concavities disappear completely or their size has no effect on the lens performance. In this embodiment, although the molding pressure was made zero once after a specified time period during the heating and pressing step and during the cooling and pressing step, a greater effect can be achieved by performing the pressure reduction twice or more depending on the shape and dimension of the lens. In addition, according to the shrinkage during cooling and pressing, a time for releasing the pressure can be selected. Furthermore, although in the present embodiment the lens material and the mold are kept in close contact, the cooling step can be carried out under the conditions that the lens and the upper mold 11 are separated by raising the pressing stage.

Eleventh Embodiment

The molding device is the same as in the second embodiment. A cylindrical optical glass SF-8 (glass transition point; 420° C., coefficient of linear expansion; $90 \times 10^{-7}$/deg at 199° C.-300° C.) 8 mm in diameter and 10 mm in length is employed. The molding method is the same as in the tenth embodiment, except that in the present embodiment the mold transfer surfaces and the lens material are always in close contact with each other, and a higher performance lens can be obtained.

Twelfth Embodiment

The molding device is the same as in the second embodiment. The material is cylindrical optical glass SF-8 (glass transition point; 420° C., coefficient of linear expansion; $90 \times 10^{-7}$/deg at 100°-300° C.) 8 mm in diameter and 10 mm in length. The preheating step is the same as in the first embodiment. Viscosity of the glass material becomes $10^{10}$ poise when the temperature of the glass material reaches 530° C. after finishing the preheating step. Then, with a pressurization of the pressing stage, the upper mold 11 starts to press the lens material. Pressure at this time is preferably 2 kg/mm² or more. The stroke which follows, which is a total heating and pressing stroke, closes the gap between the upper mold 11 and the barrel mold 14 which is formed when the lens material is supplied into the space encircled by the molding molds composed of the upper and lower molds and the barrel mold and the upper mold closely contacts the barrel mold. After pressing is carried out through the total heating and pressing stroke, application of pressure is stopped, and the molding pressure is once made zero and the upper mold 11 is separated from the lens by raising the pressing stage 15. Viscosity of the glass material at this time becomes $10^9$ poise. As the spaces 11b and 12b encircled by the mold transfer surfaces 11a and 12a and the lens material end faces have positive pressure when pressure is applied through the total heating and pressing stroke, the lens material has a part of the surface with which the mold transfer surface is not in contact. And the spaces 11b and 12b which have positive pressure at this time return to normal pressure.

Next, after again bringing the pressing stage 15 and the upper mold 11 down to contact the lens, the cooling and pressing is performed down to 430° C. Application of pressure is stopped once during the cooling and pressing step and the molding pressure is made zero by raising the pressing stage to separate the upper mold from the lens. Next, by again lowering the pressing stage 15, the transfer surface 11b of the upper mold 11 and the transfer surface 12b of the lower mold are brought into close contact with the lens material. At this time the transfer surfaces 11a and 12a are completely contacted with the lens material, and the spaces 11b and 12b which exist just before the start of the cooling and pressing step are almost eliminated. Although due to flow of the glass material in the cooling and pressing step the spaces 11b and 12b become much smaller and may remain as concavities on the lens material surface, their size is so small that it has no effect on the lens performance. Furthermore, if the coefficient of linear expansion of the lens material is equal to or more than $50 \times 10^{-7}$/deg, the concavity on the lens surface almost disappears due to a further large flow of glass material. Then application of pressure is stopped and the molding pressure is made zero. When the lens temperature within the mold reaches room temperature, the mold is opened and the lens removed.

In the above embodiment, the molding pressure is made zero after the pressing is applied through the total heating and pressing stroke and during the cooling and pressing. But, as the pressure inside the spaces 11b and 12b is caused to return to normal pressure only by reducing the pressure at the time of pressing during the total heating and pressing stroke or during the cooling and pressing, pressure reduction can be selected according to the lens material size. In addition, it is not necessary for the barrel mold 14 to regulate the lens thickness contact with the upper and lower molds as shown in FIG. 2, and a ring-like barrel mold or a block-like spacer can be installed on the outside of the upper and flower flanges 11c and 12c closely contacting the pressing stage 15 and the molding stage 16.

Thirteenth Embodiment

The molding device and the preheating step are the same as in the second embodiment. The lens material is the same material as employed in the twelfth embodiment. The heating and pressing step is completed when the pressing stage 15 and upper mold 11 are moved through the total heating and pressing stroke, after finishing the preheating step. Viscosity of the lens material at this time becomes $10^9$ poise. At the time of completion of the total heating and pressing stroke, namely, at the completion of the heating and pressing step, the lens material has a part of the transfer surface with which the mold transfer surface is not in contact. After a specified time after finishing the heating and pressing step, the molding pressure is made zero once and the pressing stage 15 is separated from the upper flange 11c by raising it. Positive pressure inside the spaces 11b and 12b encircled by the mold transfer surfaces 11a and 12a and the lens material end faces just before making the pressure zero, returns to normal pressure. Next, by again lowering the pressing stage 15, the flange of the upper mold 11 is in close contact with the pressing stage 15. Also, when the molding pressure is made zero, the transfer surfaces 11b and 12b of the upper mold 11 and the lower mold 12 are kept in close contact with the lens material as it is. At this time, the spaces 11b and 12b have considerably less volume than before.

The cooling and pressing step follows. During the cooling and pressing step, after a specified time the molding pressure is once made zero and the pressing stage 15 is separated from the upper flange 11c by raising it. positive pressure inside the spaces 11b and 12b just before making the pressure zero, returns to normal pressure. Next, the pressing stage 15 is again lowered, and brought into close contact with the mold flange 11c. At this time, the upper mold flange 11c is kept in close contact with the end face of the barrel mold 14. At this time, the spaces 11b and 12b have a considerably smaller volume than they have just before the start of the cooling and pressing step, or the spaces are almost eliminated.

The cooling and pressing down to 430° C. is carried out. Although there is a rare case in which a small concavity on the lens material surface remains after releasing the molding pressure during the cooling and pressing step, the spaces 11b and 12b are completely eliminated due to the flow caused by the shrinkage of the lens material during the cooling and pressing step. Furthermore, if the coefficient of linear expansion of the lens material is equal to or more than $50 \times 10^{-7}$/deg, the concavity on the lens surface is apt to disappear since sufficient flow can be obtained due to the shrinkage of the lens material. Then the molding pressure is made zero by stopping application of pressure. When the lens temperature within the mold reaches room temperature, the mold is opened to remove the lens.

In this embodiment, transfer characteristics are remarkably improved since the pressing stage and the upper mold flange are not fixed and the molding is performed under conditions that the molds always closely contact the lens material.

Figure 8:
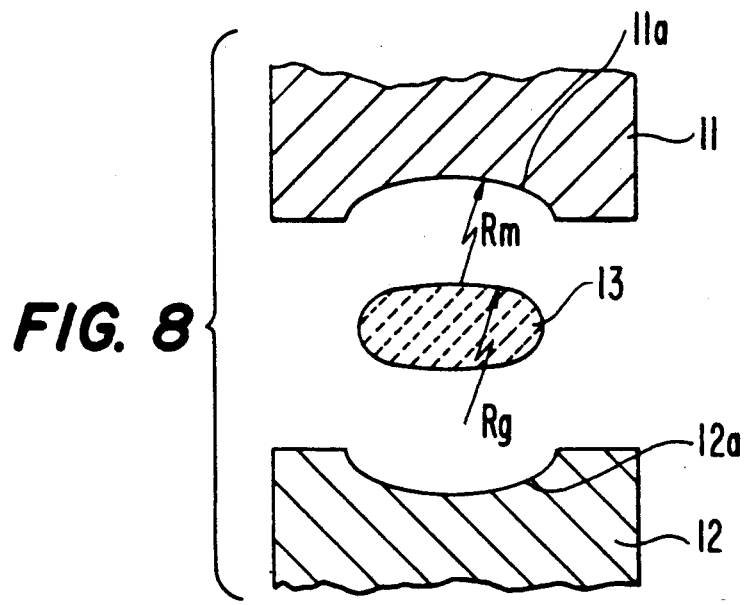
FIG. 8 shows a sectional view of molding molds and a lens material.

In the above embodiment, the molding pressure is made zero at the time of completion of the heating and pressing step and once during the cooling and pressing step. However, as the pressure inside the spaces 11b and 12b returns to normal pressure only by reducing the pressure, pressure reduction can be selected depending on the lens material size. When a relationship between a radius Rm of the mold transfer surface and a radius Rg of the lens material end face is expressed by $Rg > Rm$ as shown in FIG. 8, a closed space encircled by the mold transfer surface and the lens material end face is formed. Therefore, if selected, the molding method in the present embodiment has a remarkable effect. And it is very effective in the case of the cylindrical lens material as shown in FIG. 5 and employed in the present embodiment. In addition, the barrel mold 4 to regulate the lens thickness need not contact the upper and lower molds as shown in FIG. 2. A method adjusting a gap between the pressing stage 15 and the molding stage 16 can also be selected, in which a ring-like barrel mold or a block-like spacer is installed on the outside of the upper and lower flanges 11c and 12c closely contacting the pressing stage 15 and the molding stage 16. In addition, a lens with equally good performance can be made by adopting the mold transfer method in which the cooling and pressing step and the cooling step are transferred to a separate stage. By applying on the metal mold the molding force necessary for generating, inside the space encircled by the mold transfer surface and the lens material end face, minimum compressed air pressure necessary for releasing pressure inside the space, the space can be made small. The present embodiment was carried out using a molding pressure of 2 kg/mm² or more.

What is claimed is:

1. A lens molding method for press-molding a body of lens material placed in a space between mold surfaces of a pair of upper and lower molds by applying a molding pressure to the pair of molds to produce a lens, comprising:

placing said body of lens material in a space between said mold surfaces;

carrying out a preheating step for heating the body of lens material placed in the space between said mold surfaces of said pair of molds until the temperature of said body rises to a first predetermined temperature;

carrying out a heating and pressing step to apply said molding pressure to said pair of molds having the body of lens material placed therebetween while keeping the temperature of said body at the first predetermined temperature thereby to mold said body into a lens-form body;

carrying out a cooling and pressing step to apply said molding pressure to said pair of molds having the lens-form body placed therebetween while cooling the lens-form body until the temperature of the lens-form body is lowered to a second predetermined temperature lower than said first predetermined temperature to obtain a final lens product; and taking out the final lens product from the space between said pair of molds after the product has further cooled down, wherein the molding pressure is reduced or made zero at least once during each of (a) the heating and pressing step but before the end of the heating and pressing step, (b) the time immediately after completing the heating and pressing step, but before the begining of the cooling and pressing step, and (c) the cooling and pressing step, and wherein when the molding pressure is reduced or made zero during the heating and pressing step the body of the lens material is kept in contact with each of said molding surfaces of said pair of upper and lower molds during the entire heating and pressing step.

2. A method as claimed in claim 1, wherein the molding pressure is set such that gas having a compressed gas pressure and generated inside any space which exists between each of said mold surfaces of said pair of molds and the body of lens material is released, due to said compressed gas pressure, from said space between each of the mold surfaces of the pair of molds and the body of lens material when said molding pressure is reduced or made zero.

3. A method as claimed in claim 1, wherein the relationship between a radius Rm of the molding surface of each of said pair of molds and a radius Rg of an end surface of the body of lens material is expressed by $Rg > Rm$.

4. A method as claimed in claim 3, wherein the body of lens material is a cylindrical body.

5. A method as claimed in claim 1, wherein the process is performed under conditions for causing the upper and lower molds always to be in contact with the lens material from the beginning of the preheating step to the end of the cooling and pressing step.

6. A lens molding method for press-molding a body of lens material placed in a space between mold surfaces of a pair of upper and lower molds by applying a molding pressure to the pair of molds to produce a lens, comprising:

placing said body of lens material in a space between said mold surfaces;

carrying out a preheating step for heating the body of lens material placed in the space between said mold surfaces of said pair of molds until the temperature of said body rises to a first predetermined temperature;

carrying out a heating and pressing step to apply said molding pressure to said pair of molds having the body of lens material placed therebetween while keeping the temperature of said body at the first predetermined temperature of said body at the first predetermined temperature thereby to mold said body into a lens-form body;

carrying out a cooling and pressing step to apply said molding pressure to said pair of molds having the lens-form body placed therebetween while cooling the lens-form body until the temperature of the lens-form body is lowered to a second predetermined temperature lower than said first predetermined temperature to obtain a final lens product; and taking out the final lens product from the space between said pair of molds after the product has further cooled down;

wherein the body of the lens material is always keeps in contact with each of said molding surfaces of said pair of upper and lower molds during a time from the beginning of the preheating step through the end of the cooling and pressing step, and wherein the molding pressure is reduced or made zero at least once during the heating and pressing step but before the end of the heating and pressing step.

7. A method as claimed in claim 6, wherein the molding pressure is set such that gas having a compressed gas pressure and generated inside any space which exists between each of said mold surfaces of said pair of molds and the body of lens material is released, due to said compressed gas pressure, from said space between each of the mold surfaces of the pair of molds and the body of lens material when said molding pressure is reduced or made zero.

8. A method as claimed in claim 7, wherein the relationship between a radius Rm of the molding surface of each of said pair of molds and a radius Rg of an end surface of the body of lens material is expressed by $Rg > Rm$.

9. A method as claimed in claim 8, wherein the body of lens material is a cylindrical body.

* * * * *